Oct. 8, 1968

J. H. MORAN 3,405,349

WELL LOGGING WITH BOREHOLE EFFECT COMPENSATION AND INCLUDING MEMORY STORAGE OF BOREHOLE MEASUREMENTS

Original Filed Aug. 19, 1959

INVENTOR.
JAMES H. MORAN

BY Brumbaugh, Free
Graves & Donohue his ATTORNEYS

United States Patent Office 3,405,349
Patented Oct. 8, 1968

3,405,349
WELL LOGGING WITH BOREHOLE EFFECT COMPENSATION AND INCLUDING MEMORY STORAGE OF BOREHOLE MEASUREMENTS
James H. Moran, Juniper Ridge, Conn., assignor, by mesne assignments, to Schlumberger Technology Corporation, Houston, Tex., a corporation of Texas
Continuation of application Ser. No. 834,872, Aug. 19, 1959. This application Apr. 7, 1965, Ser. No. 449,362
19 Claims. (Cl. 324—6)

This application is a continuation of application Ser. No. 834,872, filed Aug. 19, 1959, now abandoned.

This invention relates generally to well logging methods and apparatuses adapted to determine the value of a physical property, characteristic or manifestation of the rock or other earth matter in the earth formations surrounding a borehole. While the invention is applicable to a variety of types of well logging as, say, electrode logging or neutron logging, the invention will be described herein in connection with induction logging.

As is well-known, induction logging is accomplished by lowering into the borehole a sonde carrying an array of coils of which at least one coil is used as a transmitter, and of which at least one other coil forms part of a receiver. When in place in the borehole, the transmitter coil is energized to generate a magnetic field serving to induce circulating current in a localized region in the immediate vicinity of the coil array. The receiver coil inductively responds to those circulating currents to provide from the output of the receiver circuits a signal which is a measure of the conductivity of the medium in which the currents circulate. When such medium is limited to earth matter, the conductivity indication obtained therefor provides a clue to the lithological character of the earth matter.

What is desired in induction well logging is that there be a simple correlation between the value of the mentioned signal and the value of the conductivity of only the earth matter in the immediate vicinity of the transmitter-receiver array. The ideal situation for attaining this simple correlation would be one in which such earth matter fills all of the space surrounding the transmitter and receiver coils to thereby render such coils completely embedded in the earth matter. This situation cannot, however, be realized in practice inasmuch as, in the vertical direction, the transmitter and receiver coils are surrounded by space within the borehole proper rather than by earth matter, and inasmuch as, in the horizontal direction, both the transmitter coil and the receiver coil are usually separated by more or less of a clearance space from the wall of the borehole, i.e., from the earth matter in the earth formations surrounding the borehole. Therefore, in correlating the value of the signal produced by the receiver with the conductivity value of earth matter, greater accuracy can be obtained by taking into account the fact that the presence of the borehole has an effect upon the signal value.

The manner in which the borehole affects the signal is as follows. If the borehole should happen to be of a uniform minimum diameter just sufficient to pass the sonde which carries the transmitter-receiver coil array, the borehole effect on the signal could be represented by a constant and the signal could accordingly be easily corrected to eliminate the component in the total value thereof caused by such borehole effect. However, in actual practice, the borehole diameter usually exceeds this minimum value by an amount which varies in a rather random manner with depth, and which subtracts (in proportion to the enlargement of the borehole) from the earth matter available to contribute to the receiver signal.

This random variation with depth of borehole diameter is, in itself, a fact well-known to the art. To counteract the effect thereof on the recorded logging data, it has been proposed hitherto for the case of an electrode logging system to allow for such variation by measuring the borehole diameter at one location near to or at the depth of the sonde, and by compensating the signal obtained from the sonde in accordance with this single measurement of diameter. The single measurement technique fails, however, to provide complete compensation, particularly were it to be applied to an induction logging system, for reasons as follows.

As indicated above, in induction logging the signal produced by the receiver represents the response thereof to circulating currents induced in a localized region surrounding the transmitter-receiver array. While it is desirable that such region in its vertical dimension be as small as possible (and while the vertical extent of such region can be substantially restricted by focussed coil systems such as those disclosed in the U.S. Patent No. 2,582,314 to H. G. Doll), nonetheless, where high precision measurements are involved, it is in the interest of accuracy to consider that the region wherein circulating currents significantly contribute to the receiver signal is a region which vertically extends from a point somewhat above to a point somewhat below the transmitter-receiver array. Such region, therefore, includes within its confines a section of borehole of greater length than the transmitter-receiver coil array. For example, if the coil array has an overall length of 100 inches (which is typical in commercial use), the signal contributing region and included length of borehole may extend vertically from a point two feet above the uppermost coil to a point two feet below the lowermost coil to thereby have a length on the order of twelve feet.

Within the borehole section included in the signal contributing region, considerable variation in the borehole diameter may occur from point to point in depth, and such variation will have a substantial effect upon the value of the receiver signal. Accordingly, it is not sufficient to measure the borehole diameter at just one point within that section. Instead, it is necessary to employ a technique which takes into account the variation of borehole diameter over the entire length of the borehole within the mentioned signal contribtuing region.

One such technique is the integrative method of subdividing the borehole length of interest into a number of consecutive vertical zones, and of measuring the borehole diameter in each such zone. The collection of measurements thus obtained are indicative to a good approximation of the profile of variation of borehole diameter over the mentioned borehole length.

Mere ascertainment of the borehole profile is not, however, enough to permit proper compensation of the signal for "borehole effect." This is so, since the effect of each borehole zone upon the received signal will depend not only upon the diameter of the borehole in that zone, but also upon the location of the zone relative to the transmitter-receiver array. Specifically, of two zones of equal borehole diameter which are unequally spaced from a central reference point of the array, the farther spaced zone will have less effect upon the received signal than the nearer spaced zone. Therefore, it is necessary to weight the measurement of borehole diameter obtained at each zone in accordance with the distance of the zone from the array. When the borehole measurements are so weighted, the summation of such weighted measurements will provide a figure which is representative of the effect of the overall geometric configuration of the borehole interior upon the receiver signal. This figure may be termed the "overall geometric factor."

While the geometry of the borehole interior is one parameter which determines in part the value of the receiver signal, another parameter which is also receiver signal, another parameter which is also determinative of such value is the medium which fills the borehole. The relationship between the two parameters can best be understood by considering the effect of the borehole geometry as being represented by one numerical factor and by considering the effect of the medium as being represented by another numerical factor. The latter factor complements the former in the sense that the geometric factor may be multiplied by the factor representing the medium to arrive at a figure representing the complete effect of the borehole on the signal. If the borehole should happen to be filled with air, a multiplying "medium" factor appropriate to that air medium would be employed to arrive at the figure for "borehole effect." Usually, however, the borehole is filled with a fluid such as drilling mud, and this fluid will have circulating currents induced therein by the magnetic field from the transmitter in the same way as such field induces circulating currents in the earth formations surrounding the borehole. In such usual instance where the borehole is fluid filled, the geometric factor is multiplied by the "medium" factor representing the drilling mud or other fluid in order to arrive at the figure representing complete "borehole effect."

The currents which circulate in the fluid in the borehole are often of the same order of magnitude as the currents which circulate in the earth matter surrounding the borehole. Also, the volume of fluid included within the signal contributing region is appreciable relative to the volume of earth matter included within that region. Therefore, ordinarily, a substantial fraction of the entire value of the receiver signal represents circulating currents detected in the borehole fluid itself rather than circulating currents detected in the earth formations surrounding the borehole.

It follows that the receiver signal may be considered as consisting of a wanted component and of an unwanted component. The wanted component is that part of the total value of the signal which is attributable to currents circulating in the earth matter surrounding the borehole, and which is, therefore, the desired measure of the conductivity of such earth matter. The unwanted component is that fraction of the total value of the signal which is attributable to currents circulating in the borehole fluid, and which is, therefore, undesired because it is entirely extraneous as a measure of the conductivity of the earth matter.

The degree to which currents circulate in the borehole fluid will, of course, vary directly with the conductivity of such fluid. In certain instances the value of this conductivity is a factor which may vary appreciably with depth in the borehole. In such instances, in order to obtain an accurate figure for borehole effect, it is necessary to arrive at such figure by measuring the fluid conductivity at each zone where the diameter of the borehole is measured, and by then weighting each such diameter measurement by a factor representing fluid conductivity in that zone in addition to the previously described weighting of such diameter measurement by a factor representing distance of that zone from the transmitter-receiver array. As an alternative expression of the same idea, if each zone is considered as characterized by an individual "zone" geometric factor determined by the diameter of the borehole in the zone and by the distance of the zone from the reference point central to the transmitter-receiver array, then, to the end of arriving at the figure for "borehole effect," each such "zone" geometric fatcor for a particular zone is multiplied by another "zone" factor which represents the specific conductivity value of the volume of fluid or other medium in that particular zone. By summing the respective products so obtained for all zones which contribute to the receiver signal, there will be obtained the figure for "borehole effect."

As a matter of practice, however, it has been found that, while the conductivity of the fluid filling the borehole may vary substantially from one borehole to another, in any one borehole it is usual for the value of fluid conductivity to remain sufficiently stable with depth so that such conductivity value may be treated as a constant without introducing any significant error into the determination of the "borehole effect" for that borehole. Accordingly, in the course of running a well logging test on any particular borehole, it usually is not necessary to determine the value of conductivity at each zone where the borehole diameter is meausred. Instead, in the usual case it has been found entirely satisfactory to obtain the overall geometric factor for the length of borehole which lies within the signal contributing region, and to then multiply this overall geometric factor by a factor representing one value of conductivity which is typical for all the fluid in the borehole.

Since, as described, the receiver signal from a sonde in a borehole is a signal whose value is affected by the medium within the borehole in accordance with the volumetric distribution of such medium over the length of borehole included within the signal contributing region, it is an object of this invention to provide a measure of the degree to which such medium over such borehole length affects the value of the mentioned signal. Also, it is an object to actually correct the signal so as to eliminate therefrom or reduce therein the extraneous component due to the borehole and/or to the borehole filling medium.

Since, moreover, as is evident, the mentioned volumetric distribution of the medium is a function of the geometry of the borehole over the length thereof included within the signal contributing region, another object of the invention is to provide for determination of such borehole geometry.

To the end among others of making such determination, it is still another object of the invention to obtain an indication of the value of borehole diameter or other physical condition existing at each of a plurality of vertically spaced depth points included within a limited length of the borehole extending from below to above the sonde.

A further object of the invention is to impart to each such indication a relative weight in accordance with the location of the point at which the indication is obtained relative to a reference datum.

A further object of the invention is to permit such plurality of indications to be indications which are retained and kept current in the instance where the borehole length of interest is a dynamic length in the sense that the demarcated length moves with the sonde to include different borehole depths at different times, and wherein, accordingly, the borehole length is progressively changing in respect to the plurality of vertically spaced depth points included therein at which such indications are taken.

Yet another object of the invention is to provide novel signal translating apparatus in a well logging system whereby more accurate and informative indications of formation characteristics are obtained.

These and other objects are realized according to the invention by providing sensing means adapted to be placed in a borehole to there produce a signal representative of a physical characteristic of immediately adjacent earth matter in the earth formations surrounding the borehole. Such sensing means may be the sensing equipment employed in resistivity logging or radiation logging, or as described, such sensing means may be in the form of transmitter-receiver equipment employed in induction logging. This last named equipment includes transmitting and receiver coils which are carried by a sonde suspended in the borehole by a cable. Such coil array is adapted to inductively probe a localized region of space surrounding the array to produce from the receiver output a signal representing the conductivity encountered in that region.

As stated, the output signal of the sensing means is comprised in part of an unwanted component whose value is dependent in part upon the variation in diameter of the length of the borehole which is included within the mentioned localized region. This variation is determined in the following manner. Associated with the mentioned sensing means is a means which is adapted to measure the width of the borehole at the depth at which such width-measuring means is disposed. The width measuring means may be in the form of a caliper carried by the sonde to be vertically displaced from the coil array in an amount which positions the caliper at or beyond one of the extremities of the borehole length whose geometry significantly affects the conductivity signal.

Successive indications of borehole width are derived from the caliper at a plurality of vertically spaced points in the borehole by vertically moving the sonde in a direction whereby the caliper leads the coil array, and by obtaining one such indication from the caliper each time the sonde in the course of such movement traversed one of a number of vertical intervals included within a vertical extent of the borehole equal to the mentioned length of borehole. These successive width indications may be elicited from the caliper in response to a control signal developed by a means which is synchronized with the vertical movement of the sonde to develop one such control signal after each traversal by the sonde of one of the mentioned vertical intervals.

The significance of the width indications so obtained can best be understood by considering the relationship between such indications and an upward movement of the sonde from an initial position to a new position in an amount equal to the borehole length over which the borehole width variation and the medium filling the borehole will significantly affect the output signal. For such upward movement the caliper is mounted above the coil array. The first indication derived from the caliper represents the width of the borehole at the lowest point of width measurement within the mentioned borehole length when the sonde is at its new position. In like manner, the second indication derived from the caliper represents the width of the borehole at the second lowest point of width measurement within the mentioned borehole length; and so on. The indication derived from the caliper just before the sonde reaches its new position is an indication of the borehole width at the point of width measurement which lies highest within the borehole length which significantly affects the signal from the coil array when the sonde is at its new position. Therefore, in the course of movement of the sonde from its old to its new position, there is derived from the caliper a series of indications representing all of the borehole width measurements made at points lying within the mentioned borehole length.

Each width indications when produced is stored in a memory means having a number of storage positions at least equal to the number of indications produced over a movement of the sonde equal to the mentioned length of borehole. Each stored indication is successively advanced from the first to the last storage position as new indications are accumulated by the memory means. Once the full complement of indications has been stored, room is made for storage of each additional indication by dropping from the last storage position the then oldest stored indication. The mentioned memory means is thus characterized by an "in-and-out" or "circulating" memory feature.

A novel form of such memory means according to the invention, comprises a multi-stage digital register wherein indications of borehole characteristics are stored and translated in digital form. The indications are produced as multi-digit binary signals which are shifted through successive register stages in accordance with the "circulating" feature.

Other forms which such memory means may take are, for example, a magnetic core shift register, or a magnetic disc wherein indications are recorded seriatim in a circular path until the limiting number of indications has been reached, and whereon room is made thereafter for recording each new indication by erasing from the disc the then oldest recorded indication.

The plurality of stored indications of borehole width at points within the borehole length of interest are indications which are rendered available from the memory means by suitable circuit means. They are then combined to form a correction signal representative of the effect of the borehole interior on the value of the output signal developed by the sensing means. Before or upon being so combined, however, each such width indication is weighted in dependence on the vertical distance of the point at which the indication is taken from the location occupied by a central point of the coil array at the time of weighting. While this criterion of vertical distance from a central point of the coil array determines the amount of weighting which is employed in each instance, the amounts of weighting determined by this distance criterion are properly associated with the various ones of such width indications stored in the memory means by correlating such amounts of weighting with the storage positions of the indications in the memory means. For example, since the latest and earliest stored of such indications will respectively occupy the first and last storage positions of the memory means (in the instance where the number of such storage positions is equal to the number of indications of borehole width at points within the borehole length of interest), and, since these latest and earliest stored indications are always representative of the width of the borehole at, respectively, the two points which are the lowest and highest points within the borehole length of interest (i.e., the points in such length farthest removed from the coil array), the indications occupying those first and last storage positions are given the least weight. Conversely, the indications occupying the middle one or two storage positions are given the most weight, since those last-named indications are always representative of the width of the borehole at the one or two points within the borehole length of interest which are closest to the coil array.

Once such stored indications have been distance-weighted as described, they are collectively representative of the effect of the variation in width of the borehole on the value of the output signal from the sensing means. However, they do not yet reflect the effect on the mentioned output signal of the value of conductivity of the fluid or other medium by which the borehole is filled. To incorporate such conductivity factor there must be a further weighting.

As previously described, such weighting may be on a point by point basis, i.e., may be carried out by measuring the conductivity of the fluid at or near each point where a measurement of borehole width is taken, and by then weighting the width indication obtained at each point (and as already weighted for distance) in dependence on the conductivity value measured at that point. Evidently this point by point procedure for conductivity weighting requires that such weighting take place before the stored and appropriately weighted indications are combined to form the correction signal.

Ordinarily, however, sufficiently accurate results are obtained when the conductivity of the borehole filling medium is considered to be of constant value over the entire vertical depth of the particular borehole for which a well log is being obtained. Therefore, ordinarily, the value of the conductivity of the medium filling a particular borehole may be incorporated as a factor into the obtained correction signal by measuring the typical value of conductivity for that particular borehole, and, thereupon, by weighting such correction signal in dependence on the measured typical value of conductivity at the time or after the correction signal has been formed by the combining of the stored, distance-weighted indications.

Having weighted the correction signal for conductivity, the value of the correction signal is representative of the combined effect on the output signal from the sensing means of both the variation in width of the borehole over the length thereof which can affect such output signal, and, also, of the conductivity in that borehole length of the medium which fills the borehole. Hence, the correction signal at this point is completely representative of the degree to which the output signal from the sensing means contains an unwanted component attributable to "borehole effect." To eliminate or reduce this unwanted component, the correction signal may be combined by suitable circuit means in subtractive relation with the output signal to thereby produce a modified output signal from which the unwanted component is entirely or largely absent.

From the foregoing it should be evident that, as the sonde is moved vertically in the borehole by distances greater than the length of borehole capable of producing a significant effect upon the output signal from the sensing means, such output signal will be continuously corrected for "borehole effect."

For a better understanding of the invention, reference is made to the following description of a representative embodiment thereof, and to the accompanying drawings wherein.

Figure 1:
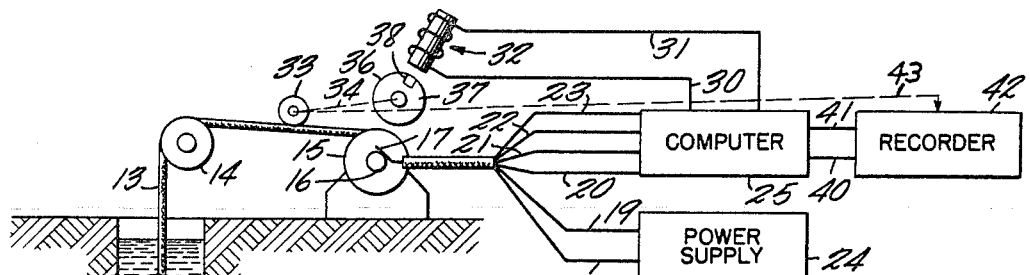
FIG. 1 is a schematic diagram in plan view of an embodiment, according to the invention, of well logging equipment.
Figure 1:
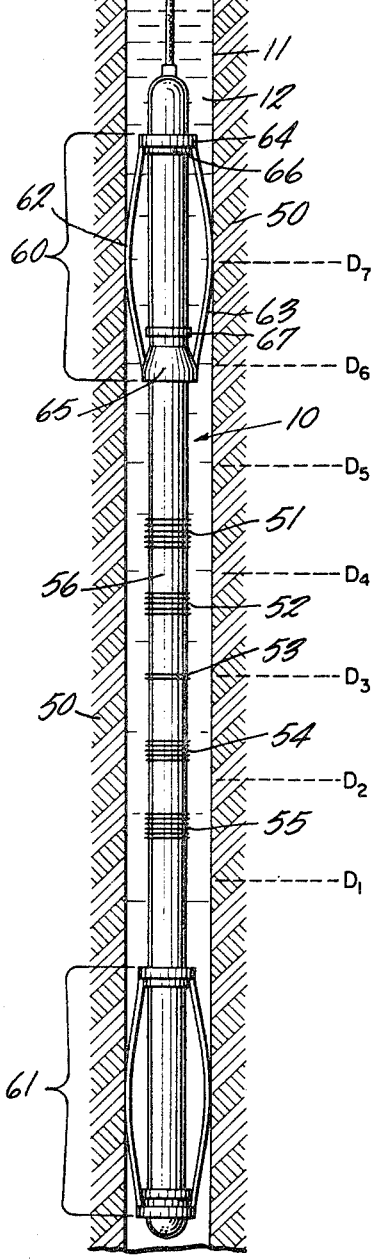

Referring now to FIG. 1, this figure shows a sonde 10 suspended by an armored cable 13 in a borehole 11 filled with drilling mud 12. The cable passes over a pulley 14 to a winch 15 adapted to wind in or pay out the cable or to maintain it stationary. Through the center of the cable run a plurality of conductors (not shown) which transmit power from the surface to the sonde 10 and signals from the sonde 10 to the surface. Such conductors are electrically connected at the surface to slip rings which are on the shaft of winch 15, and of which one slip ring 16 is shown. The slip rings are contacted by respective brushes of which the brush 17 is shown as contacting the slip ring 16. The brushes are each electrically connected to one of a plurality of leads 18–23. Of these leads, the leads 18, 19 carry power flowing from a surface power supply 24 to the sonde 10. The other leads 20–23 carry signals (to be later described) which are transmitted from the sonde 10 to a surface computer 25.

Additional signals in the form of control pulses are supplied to computer 25 from a magnetic pickup 32 by way of leads 30, 31. Such pulses are generated in the following manner. A drive wheel 33 is coupled to rotate in synchronism with the vertical movement of the sonde 10 in borehole 11. While such coupling is shown schematically in FIG. 1 as being accomplished by having the drive wheel 33 in frictional contact with the cable 13, the wheel 33 may be driven in any suitable manner which produces a synchronous relation between its rotation and the vertical movement of the sonde.

The rotary motion of the drive wheel 33 is transmitted through a motion linkage (represented by the dash line 34) to produce corresponding rotation beneath the pickup 32 of a signal generating wheel 36. The wheel 36 is comprised of a disc 37 of non-magnetic material and of a small permanent magnet 38 received within a notch formed in the periphery of the disc. As the wheel 36 rotates, the magnet 38 will intermittently pass under the pickup 32. Each such passage of magnet 38 actuates the pickup to generate one of the mentioned pulses which are supplied to computer 25. The relation between the rotary movement of wheel 36 and the vertical movement of sonde 10 is selected to be such that one such pulse is generated each time the movement of sonde 10 in the borehole 11 brings the center of the sonde to one of a number of vertically spaced points of which the depth of each point is known or can be ascertained from the length of cable payed out at the time. A series of such points $D_1$–$D_7$ is shown in FIG. 1. The vertical intervals between such points are equal and of a predetermined value, as, say, a value of one foot or two feet.

The computer 25 responds to the input signals and control pulses received thereby to provide an output signal which is supplied by leads 40, 41 to a recorder 42. The recorder 42 may be of the well-known type wherein a web of recording paper moves beneath a recording pen, and wherein the recording pen is deflected normally of the direction of paper movement in an amount proportional to the value of the signal received by the recorder. Preferably, in the recorder 42 the movement of the paper web is synchronized with the vertical movement of sonde 10 in borehole 11 in a manner whereby the displacement in the direction of movement of any point on the paper relative to a reference or starting point is a displacement which represents absolute borehole depth and may be directly read in terms of absolute borehole depth. This may be done by coupling the web driving mechanism of the recorder through a motion transmitting linkage (represented by dash line 43) to the drive wheel 33. Any other suitable form of synchronization may be used. When the movement of the paper web of the recorder is so synchronized with the vertical movement of the sonde, the recording which results is a log of the variations with depth in the borehole 11 of the physical quantity represented by the signal received by recorder 42 from computer 25.

This signal is originated in the shown embodiment by the action down in the borehole of equipment which is carried by sonde 10, and which senses a physical characteristic or manifestation of the earth matter in the earth formations 50 surrounding the borehole 11. While such equipment can be of the type employed in resistivity logging or radiation logging (e.g., neutron or gamma ray logging) as well as induction logging and while, if of the induction logging type, such equipment may be of any suitable form, the equipment illustrated in FIG. 1 is an embodiment of a focussed induction logging system of the type described in the previously mentioned U.S. Patent 2,582,314 to H. G. Doll. As disclosed in that patent, such focussed system may be comprised of an array of five coils. Those five coils are represented in FIG. 1 by the induction coils 51–55 which are wound upon a non-magnetic hollow mandrel 56 which is the principal structural component for the sonde 10.

In this five coil array, the upper coils 51 and 52 are interconnected in a series manner and function as a pair of transmitter coils, coil 52 being the principal transmitter coil and coil 51 serving primarily to provide vertical focussing action. The lower coils 53–55 are also interconnected in a series manner but instead, function as a set of receiver coils. Coil 54 constitutes the principal receiver coil, while coil 55 provides primarily for vertical focussing and coil 53 serves primarily to cancel the effects of direct flux coupling between transmitter and receiver coils. Suitable means for operating the transmitter and receiver coils are contained within the upper portion of the mandrel 56. Such means may include electronic circuits such as disclosed in U.S. Patent 2,788,483 to H. G. Doll for balancing out or cancelling any components of reactive phase in the received signal. After modification by such circuits to eliminate the reactive phase components, the signal is transmitted as a D.C. signal from sonde 10 to the computer by way of selected conductors in cable 13 and, from thence, by way, as described, of the leads 20 and 21.

The five coil array is maintained in centered position within the borehole 11 by the bowed spring centering assemblies or guides 60 and 61 which respectively encircle the upper and lower ends of the mandrel 56. The upper guide 60 includes bowed springs of which four is a convenient number of springs. Only the springs 62 and 63 are shown. The upper and lower ends of such springs are respectively connected to an upper collar 64 and to a lower collar 65 vertically spaced from the upper collar. Both collars are slidable on the mandrel 56. The resiliency of the springs serves to urge the collars 64 and 65 toward each other. The mutual approach of the collars under such urging is, however, limited by a stop 66 and a stop 67 which are mounted on mandrel 56 at, respectively, a position below collar 64 and a position above collar 65. When the sonde 10 is in the borehole, the sides of the borehole press against the springs which yield in a manner maintaining the top of sonde 10 in centered relation in the hole.

The lower guide 61 is similar in structure and operation to the upper guide 60. Accordingly, the cooperative action of the upper guide 60 and the lower guide 61 is such as to maintain the entire length of sonde 10 in centered relation in the borehole. The guides 60 and 61 are disposed on the sonde 10 far enough away from the coil array 51–55 so that the metallic material of the guides does not adversely affect the inductive probing actions of the coil array.

The presently described embodiment employs means to obtain a measure of the inner diameter characterizing the borehole wall at the point opposite the measuring means. While such measuring means may be of any suitable form, it may conveniently take the form of the caliper device disclosed in U.S. Patent 2,639,512 to J. C. Legrand.

According to the teachings of this Legrand patent, the lower collar 65 is constituted of magnetic material and is formed to have a tapered cross-section. When the collar 65 has this construction, a variation in the displacement of the collar relative to its stop 67 serves to vary the mutual inductance of a transformer (not shown) which is contained within mandrel 56 at a fixed position near to or within the vertical section of the mandrel over which the collar 65 is variably positioned.

To operate the caliper device, the sonde 10 is moved continuously in an upward direction. An extent of such upward movement is represented in FIG. 1 by movement of the sonde from a position where the springs of the assembly 60 contact the wall of the borehole below point $D_1$ to a position where such springs contact the borehole wall at a point above the point $D_7$. Within this vertical extent of upward movement, the portion thereof which includes the points $D_1$–$D_5$ is the length of borehole over which the drilling mud 12 will significantly affect the output signal from the sonde when the sonde is in the position shown in FIG. 1.

When the sonde is so moved continuously, the drag in borehole 11 of the drilling mud 12 on upper collar 64 locks this collar against its stop 66. However, the lower collar 65 remains free to move. This lower collar will, accordingly, be displaced relative to its stop 67 in an amount which varies in dependence on the degree to which the bowed springs of assembly 60 are pressed inwardly by the wall of the borehole. It follows that, at any instant of time, the displacement of collar 65 relative to stop 67 is a measure of the width of the borehole at the point contacted at that time by the springs of assembly 60.

While the collar 65 is being variably displaced in the manner described, an alternating current of constant amplitude and frequency is applied to the primary of the transformer within mandrel 56. This constant value alternating current induces in the secondary of the transformer an alternating voltage having an amplitude which is dependent on the mutual inductance existing between the primary and secondary windings. The value of this mutual inductance is, at any instant, a function of the displacement of collar 65 relative to stop 67. Therefore, at any instant, the alternating output voltage from the transformer is an electrical signal which is representative of the width of borehole measured at that instant by the springs of assembly 60. By establishing suitable selected quantitative relations between the variation in borehole width as measured by the springs and the resulting variation in displacement of collar 65, and, also, between such variation in displacement and the resulting variation in mutual inductance of the mentioned transformer, the amplitude of the output signal from the transformer may be made directly proportional to the width of borehole. Such output signal is transmitted to the surface computer 25 by way of selected conductors in cable 13 and, thereafter, by way of the leads 22, 23 which feed the computer.

To summarize the foregoing in respect to the inputs to the surface computer 25, such inputs are as follows. The leads 20, 21 supply the computer with a D.C. signal having an amplitude resolvable into two components. As earlier explained, these components are (1) a wanted component representative of the conductivity of the earth matter within the localized region of space contributing to the signal received by the coil array and (2) an unwanted extraneous component produced by circulating current in the drilling mud occupying the length of borehole in that region.

The computer 25 is also supplied by leads 22, 23 with a continuous A.C. signal whose amplitude varies in accordance with the measured width of the borehole 11. Finally, the leads 30, 31 supply to computer 25 from magnetic pickup 32 a series of control pulses occurring at respective times when the caliper device is positioned at consecutive depth levels which are separated by vertical intervals of predetermined value. In the presently described embodiment, one of such control pulses is generated each time the springs of the caliper device 60 contact the wall of the borehole at a position corresponding to one of the depth levels $D_1$–$D_7$ which are shown in FIG. 1.

Figure 2:
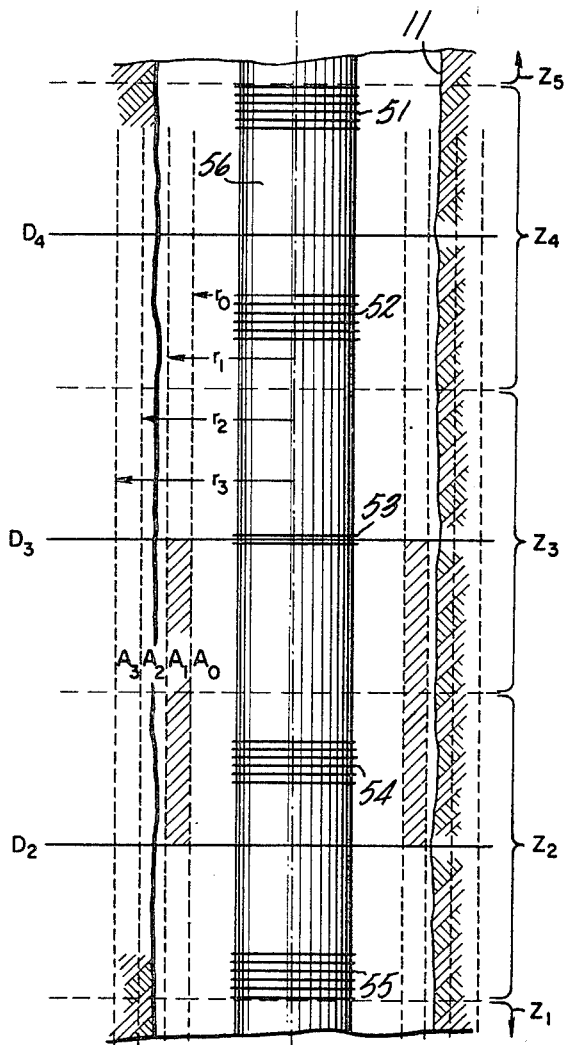
FIG. 2 is an enlarged view of a portion of FIG. 1.
Figure 3:
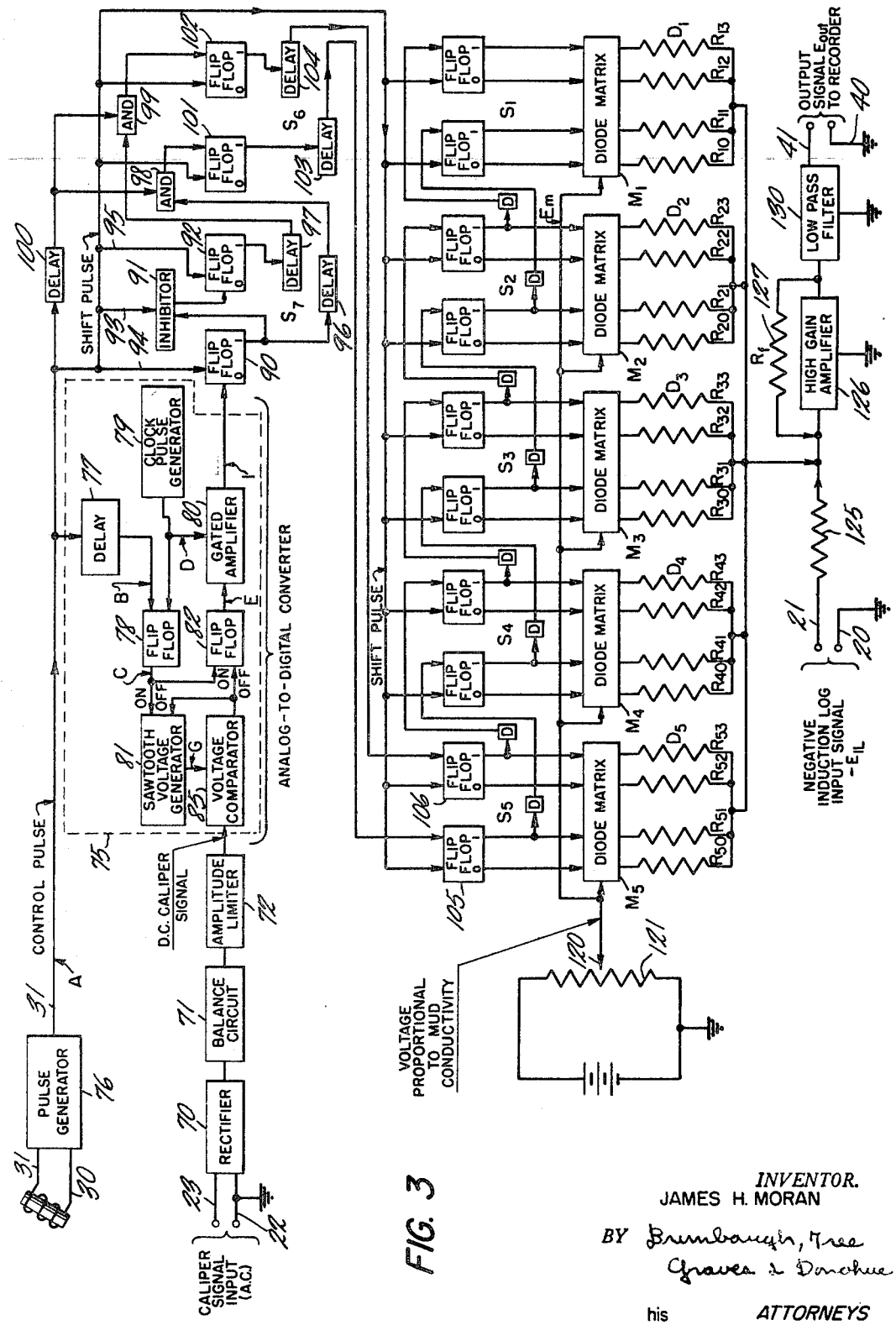
FIG. 3 is a block diagram of the circuits of the computer component of the FIG. 1 embodiment.

The circuits of computer 25 are shown in block diagram in FIG. 3. Referring to this last-named figure, the A.C. signal representing borehole width is applied from leads 22, 23 to a rectifier stage 70 which converts such signal to a D.C. voltage having an amplitude which is proportional at any time to the width of borehole measured at that time by the described caliper device. This D.C. voltage is applied as an output from rectifier stage 70 to a balance circuit 71 which may be in the form of a simple resistor network for adding an opposite polarity "balance" or "zero set" voltage to the output voltage from the rectifier. The balance circuit subtracts from the amplitude of the signal applied thereto an amount corresponding to the minimum width $r_0$ (FIG. 2) of the borehole which will pass the sonde 10. Hence, at the output of stage 71 the D.C. signal will be proportional in amplitude to the quantity $(r-r_0)$ where $r$ is the radial displacement of the wall of the borehole from the center thereof. From the output of stage 71 the signal is passed through an amplitude limiter 72 which serves to restrict the amplitude of the signal (and, thereby, the value of $r$) to the upper value which is capable of being handled by the circuits which follow.

From limiter 72 the D.C. caliper signal is applied as an input to an analog-to-digital converter 75. Another input for this converter is produced as follows. Each control pulse generated by magnetic pickup 32 is regenerated and reshaped by a pulse generator 76. The reshaped pulse (FIG. 4, waveform A) is applied in converter 75 to a delay circuit 77 providing a short time delay of, say, 0.001 second.

Figure 4:
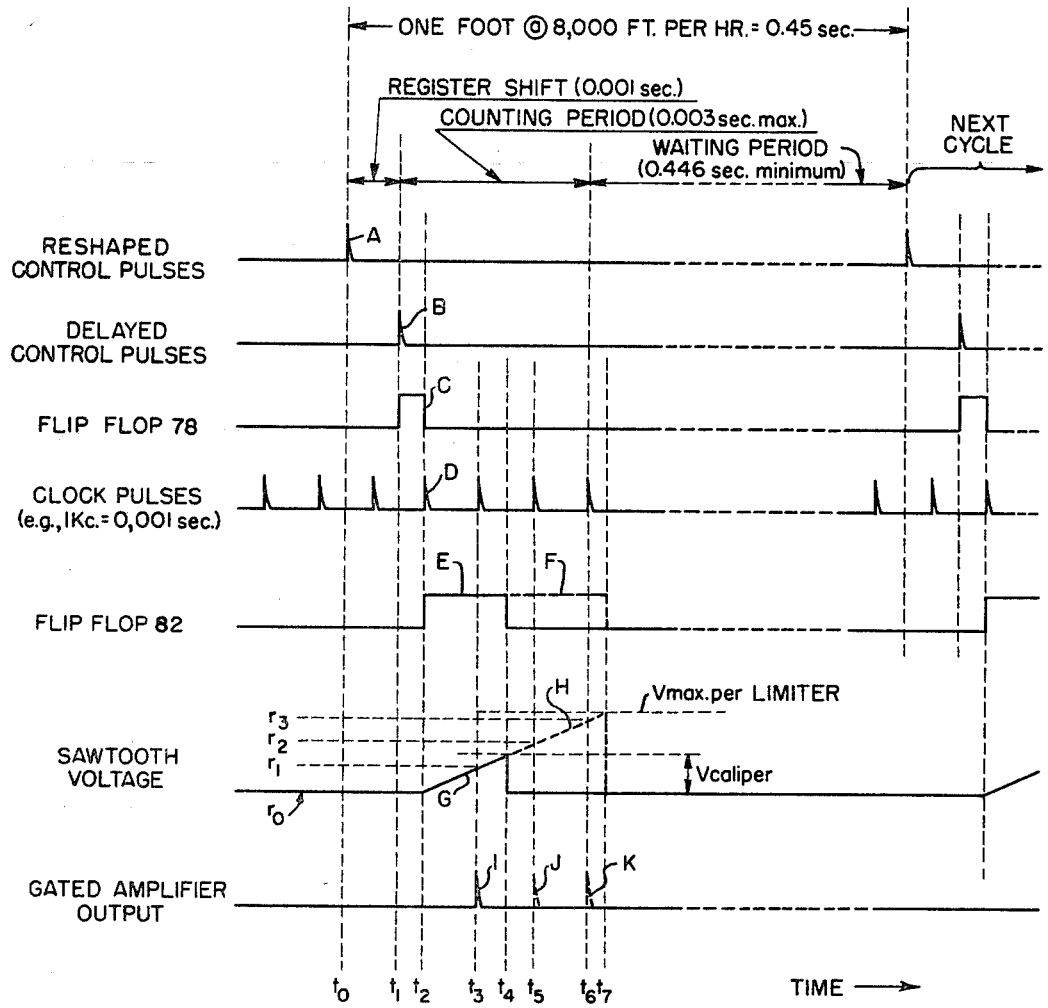
FIG. 4 shows in a qualitative manner the character of waveforms generated in the FIG. 3 circuits.

The delayed control pulse (FIG. 4, waveform B) is applied to a first input of a flip-flop or bistable multivibrator circuit 78 to turn this circuit "on." When in an "on" state, the multivibrator 78 produces a positive square wave output (FIG. 4, waveform C). Associated with multivibrator 78 is a clock pulse generator 79 of which the output clock pulses (FIG. 4, waveform D) may be separated by intervening time periods of, say, 0.001 second, i.e., have a pulse repetition frequency of 1 kilocycle. These clock pulses are applied to the signal input of a gated amplifier 80, and, also, to a second input of the bistable multivibrator 78. The clock pulses applied to circuit 78 are effective to change this multivibrator circuit back to the "off" state by the clock pulse which next follows the delayed control pulse by which such multivibrator was triggered to the "on" state.

The turning "off" of circuit 78 will be manifested as a negative-going, lagging edge in the square wave output of the circuit. This negative going edge operates as a trigger for a sawtooth circuit 81 and, also, for a gating flip-flop or bistable multivibrator circuit 82. The sawtooth generator 81 responds to such trigger to initiate the generation of a linear sawtooth wave (FIG. 4, waveform G, H). The gating multivibrator 82 responds to the mentioned trigger to produce a positive square wave output (FIG. 4, waveform E, F). This output is applied to the gated amplifier 80 to gate that amplifier to pass the clock pulses applied thereto. The number of clock pulses so passed will be proportional to the duration of the gating wave. If the gating wave has the duration indicated in FIG. 4 by the solid line E, then the amplifier 80 will pass only one clock pulse, namely the pulse I which is shown in the bottom waveform of FIG. 4. If, on the other hand, the gating wave has the duration indicated by the dotted line F, then the amplifier will pass all three of the clock pulses I, J and K which are shown by such bottom waveform.

To the end of controlling the duration of the square wave which gates amplifier 80, the sawtooth wave from sawtooth generator circuit 81 is applied to one input of a comparator circuit 85 which receives as another input the D.C. caliper signal from amplitude limiter 72. This comparator circuit is of a well-known type which is adapted to produce an output pulse at the particular time when the amplitude of the input sawtooth reaches coincidence with the amplitude of the input D.C. signal. In view of the linear rise in amplitude of the sawtooth wave received by comparator 85, the time interval intervening the initiation of such sawtooth and the production of the comparator output pulse is an interval which varies in direct proportion to the amplitude of the input D.C. caliper signal.

The output pulse is made use of as follows. First, it is applied to sawtooth generator circuit 81 to terminate the sawtooth wave produced thereby. Second, and more important, the mentioned comparator output pulse is applied from circuit 85 to turn "off" the multivibrator 82 to thereby terminate the gating of amplifier 80 by the square wave output from this multivibrator.

After this square wave output has been so terminated, no more clock pulses can pass through the amplifier 80. It follows that the number of clock pulses passed by amplifier 80 will be in direct proportion to the amplitude of the D.C. caliper signal at the input of camparator 85.

The foregoing circuits are all conventional. Many of them are described in textbook Pulse and Digital Circuits by Millman and Taub (published by McGraw-Hill, 1956).

A comparison of FIGS. 2 and 4 furnishes a specific understanding of the significance of a variation in the number of clock pulses appearing at the output of amplifier 80. As shown in FIG. 2, the region of space surrounding the borehole may be geometrically subdivided into a number of concentric cylindrical shells which are characterized by respective outer radii $r_0$, $r_1$, $r_2$ and $r_3$ of progressively larger size. The innermost shell of radius $r_0$ represents the minimum space which will permit passage of sonde 10 through borehole 11. This minimum space is assumed as being present and, as described, the D.C. caliper signal is corrected on the basis of this assumption so that the amplitude of the signal is proportional to $(r-r_0)$ rather than $r$, the radial displacement of the wall of the borehole from the center thereof.

The particular amplitude values of corrected D.C. caliper signal which correspond to the radii $r_0$–$r_3$ are indicated in FIG. 4 (waveform G, H) by the D.C. levels of corresponding designation. Note that, as would be expected, in the corrected caliper signal an amplitude level of zero corresponds to the radius $r_0$ of FIG. 2 Because of the limiting action of the amplitude limiter 72 (FIG. 3), the greatest amplitude which the corrected caliper signal can attain is just slightly greater than that corresponding in FIG. 2 to the radius $r_3$. This maximum effective radius will usually correspond to the maximum usable operating limit of the caliper device which, in turn, will usually correspond to the maximum borehole diameter likely to be encountered in the majority of cases. The limiting action serves to insure that under no circumstances will more than three clock pulses appear at the output of the analong-to-digital converter 75 for a given diameter measurement. This, in turn, serves to insure against improper operation of the subsequent digital circuits which, for the present embodiment, are constructed to handle a miximum of three pulses for each diameter measurement.

In the analog-to-digital converter 75, the rate of amplitude rise of the sawtooth wave (FIG. 4, waveform G, H) is correlated with the values $r_0$–$r_3$ of the D.C. caliper signal to establish between such amplitude values and the number of output pulses from amplifier 80 the relationship which is indicated by the first two columns of the following table.

| Caliper signal amplitude range | Resulting number of output pulses | Resulting binary indications |
|---|---|---|
| $r_0$ to $r_1$ | 0 | 0–0 |
| $r_1$ to $r_2$ | 1 | 0–1 |
| $r_2$ to $r_3$ | 2 | 1–0 |
| $r_3$ or greater | 3 | 1–1 |

Thus, for example, two output pulses indicate that, at the time of such pulses, the wall of the borehole lies within the cylindrical shell whose inner radius is $r_2$ and whose outer radius is $r_3$.

In addition to indicating borehole width, each group of output pulses from amplifier 80 is a width indication which corresponds in its timing to a particular depth at which the indicated width is measured. This is so, since the time of occurrence of each pulse group closely approximates the time of occurrence of the control pulse (FIG. 4, wave form A) which initiates the production of the pulse group, and since such control pulse occurs at a time when the caliper device 60 is gauging the width of the borehole at a known depth level. While a short time period intervenes between the generation of each control pulse and the appearance of the resulting pulse group at the output of amplifier 80, this time period may be disregarded since it is negligible in terms of the amount of movement undergone by sonde 10 during that period. In other words, no correction need be made for the slight upward change of position of sonde 10 which occurs between the generation of a control pulse by pickup 32 and the delayed appearance at output of amplifier 80 of the width indicating pulse group initiated by that control pulse.

As described, a control pulse (and, therefore, a pulse group from amplifier 80) is produced each time the sonde 10 in its upward movement brings the contact areas of the spring of caliper device 60 to one of the depth levels $D_1$–$D_7$ which are shown in FIG. 1. Hence, as such spring contact areas are moved from below level $D_1$ to above level $D_7$, there will be generated seven successive grouped pulse indication which respectively indicate by the number of pulses in each the width of the borehole at the seven successive levels $D_1$–$D_7$. For convenience, the one of such indications which is earliest will be designated "$D_1$" in the view that it corresponds with the $D_1$ depth level. The remaining six indications will likewise be designated according to the depth levels to which they respectively correspond.

Each such grouped pulse indication is not only a measure of borehole width, but is also a measure of (1) the volume within a particular depth zone of the space occupied by the borehole interior rather than earth matter, and, (2) therefore, the volume of drilling mud within that zone. This fact is made evident by FIG. 2 in which the depth traversed by the borehole is illustrated as geometrically subdivided into consecutive depth zones of equal vertical extent of which the zones $Z_2$–$Z_4$ are fully shown, and of which the zones $Z_1$ and $Z_5$ are partially shown. Each zone transects the cylindrical shells of respective outer radii $r_0$–$r_3$ to form within each zone a set of geometric rings of which the rings $A_0$–$A_3$ are shown for the zone $Z_3$. Within the vertical extent of each zone, the radial displacement of the wall of the borehole from the center thereof is a displacement which, actually, may vary somewhat with depth, but which, as a practical matter, is typified by a single borehole radius measured for that zone. In FIG. 2, the relation between the shown depth levels and the shown depth zones is such that the borehole radius at depth level $D_3$ typifies the borehole radius over all of the vertical extent of zone $Z_3$. Since all zones are of equal vertical extent, the volume therein of borehole interior (and, hence, of drilling mud) is directly proportional to the radial extent of the borehole. Therefore, a measure of the typical radius of any zone is also a measure of the volume in that zone of borehole interior space and of drilling mud.

From what has been said, it will be clear that the five grouped-pulse indications corresponding to the depth levels $D_1$–$D_5$ are, collectively, a measure of the volumetric distribution of drilling mud over the length of the borehole within which the drilling mud will significantly affect the output signal from sonde 10. In order, however, to make best use of such collective measure, it is desirable that such indications be characterized by simultaneity of existence so that they may be electrically combined to form a signal. To this end, the seven pulse-group indications $D_1$–$D_7$ are consecutively fed to a memory storage circuit (FIG. 3) having seven sections. The reason why seven sections are employed, instead of just five sections corresponding to the five indications of borehole width within the mentioned borehole length, is that the caliper 60 is disposed above the upper extremity of this length in order to avoid adversely affecting the inductive probing action of the coil array. Because of this disposition of the caliper, when the described sonde is in the position shown in FIG. 1, the width indications $D_6$ and $D_7$ produced by the caliper are indications of borehole width at points $D_6$ and $D_7$ presently outside the borehole length (formed of zones $Z_1$–$Z_5$) in which drilling mud affects the output signal from the sonde. Even so, the $D_6$ and $D_7$ indications must be stored since the depth points to which those indications correspond will eventually fall within the significant borehole length as the sonde moves further upwardly.

The seven storage sections of the memory circuit are designated from first to last in the direction of signal flow as, respectively, the sections $S_7$ to $S_1$. The inverse order of designation of the sections is appropriate in the view that, as of the time represented in FIG. 1 where the spring contact areas of the caliper device 60 have just reached the depth level $D_7$, the indications $D_1$–$D_7$ developed up to that time will be distributed in the several sections of the memory circuit in a manner whereby the subscript reference numerals of the indications correspond with the subscript reference numerals of the sections. Specifically, the earliest occurring or $D_1$ indication will at that time be stored in the last or $S_1$ section, the latest occurring or $D_7$ indication will be stored in the first or $S_7$ section, and so on.

The circuitry and operation of the memory circuit can best be understood by considering the application thereto of a sequence of indications starting with the application of the $D_1$ indication at a time when all sections of the memory circuit are cleared. The $D_1$ indication is applied from gated amplifier 80 to the $S_7$ section and, within that section, to a flip-flop circuit 90. At this time, the flip-flop 90 is connected through an inhibitor circuit 91 to another flip-flop circuit 92 in such manner that the two flip-flops 90 and 92 form the first and second stages of a two stage binary counter. The well-known operation of such counter is to count the number of pulses applied thereto to register such number of pulses as a binary indication. The relationship between the counted number of pulses and the resulting registered binary indication is set forth in the second and third columns of the above table. Thus, if, for example, the $D_1$ indication to the counter includes three pulses (corresponding to a borehole radius of $r_3$ or greater), the counter 90, 92 responds to this number of pulses to register the binary indication 1–1. In any such binary indication, the lefthand binary digit is represented by the state of flip-flop 90, whereas the righthand digit is represented by the state of flip-flop 92. Each flip-flop when in an "off" state represents the binary digit "0" and when in an "on" state represents the binary digit "1."

The $D_1$ indication remains stored as a binary indication in section $S_7$ until the occurrence of the next following or $D_2$ control pulse. This pulse is applied to the $S_7$ section to produce the following effects. First, the pulse is applied through lead 93 to the inhibitor circuit 91 to electrically disconnect the flip-flop 92 from the flip-flop 90. In this manner, any changes in state of flip-flop 90 will not affect flip-flop 92.

Second, the control pulse is applied through leads 94 and 95 to, respectively, the flip-flops 90 and 92. As so applied to the flip-flops, the pulse has the effects of (a) changing either flip-flop back to the "off" or "0" state if previously in the "on" or "1" state, (b) inducing each such flip-flop to produce an output indication corresponding to the binary digit "0" or the binary digit "1" in consonance with whichever of those binary digits was previously registered by such flip-flop. These respective output indications from flip-flops 90 and 92 are separately transmitted through the delay circuits 96 and 97 to the AND circuits 98 and 99.

Third, the $D_2$ control pulse is applied through a delay circuit 100 (providing approximately the same time delay as circuits 96 and 97) to gate the AND circuits 98, 99 to permit passage through such circuits of the mentioned indications from flip-flops 90, 92 to, respectively, the flip-flops 101 and 102 in the section $S_6$ of the memory circuit. The last named flip-flops 101, 102 will each respond to the indication received thereby to register by, respectively, an "off" state or an "on" state that one of the binary digits "0" and "1" which is represented by the received indication.

Accordingly, the overall effect of the application of control pulse $D_2$ to section $S_7$ is to clear that section and to effect a shift from that section to section $S_6$ of the stored binary indication $D_1$.

In connection with the above, it will be noted that the AND circuits 98, 99 perform the function of precluding actuation of the flip-flops 101 and 102 of section $S_6$ by outputs produced by flip-flops 90 and 92 of section $S_7$ when those flip-flops 90 and 92 happen to change state in response to a width indicating pulse received from amplifier 80.

After section $S_7$ has been cleared with accompanying shifting of the $D_1$ binary indication to section $S_6$, the $S_7$ section receives from amplifier 80 the group of pulses representing the $D_2$ width indication. Because of the action of delay circuit 77 (in the analog-to-digital converter 75) this $D_2$ pulse-group indication is not applied to section $S_7$ until after the $D_2$ control pulse has reset the flip-flops 90 and 92. Accordingly, when the $D_2$ grouped pulse indication is applied, the $S_7$ section is in a condition to convert such indication into a stored binary indication.

Returning to the $D_1$ indication, the $S_6$ section in which this indication is now stored is not a binary counter section, but, instead, is simply a two stage register section. However, the $S_6$ section is like the $S_7$ section in that undelayed control pulses are applied thereto to reset to "0" state (if necessary) either of flip-flops 101, 102, and to transfer each binary indication registered jointly by those flip-flops through delay circuits 103, 104 to a set of flip-flops 105, 106 in the $S_5$ section. As an example, the occurrence of the $D_3$ control pulse will cause the $D_1$ binary indication stored in section $S_6$ to be shifted to section $S_5$. Shortly thereafter, section $S_6$ receives the $D_2$ binary indication previously stored in section $S_7$. Simultaneously, the section $S_7$ is operating to register as a binary indication the $D_3$ pulse group received from gated amplifier 80.

With regard to the pairs of delay circuits 96, 97; 103, 104; and so on, which are interposed between the respective pairs of flip-flops of consecutive sections of the memory circuit, such delay circuits perform the function of delaying the shift of a binary indication from one section to the next until the flip-flops of the next section have had an opportunity to become reset by an undelayed control pulse.

The circuitry and operation of the component circuits of the memory circuit are described in further detail in the mentioned Millman and Taub textbook.

From the foregoing, it will be clear that, as the $D_1$ to $D_7$ indications are successively received by the memory circuit, the $D_1$ binary indication is progressively shifted through the several sections of that circuit until the indication becomes stored in the last or $S_1$ section. At this time, each of the other indications $D_2$ to $D_6$ will be stored in the memory circuit in the sections of corresponding numerical subscript. If now there occurs a following $D_8$ control pulse and a resulting $D_8$ indication (when sonde 10 is moved upwardly from the position shown in FIG. 1 to bring the springs of guide 80 into contact with the borehole at a depth level $D_8$ not shown in FIG. 1 but spaced above level $D_7$ by the vertical interval separating adjacent ones of levels $D_1$–$D_7$), the $D_1$ indication is dropped from storage, the $D_2$ to $D_7$ indications are shifted to be stored in sections $S_1$ to $S_6$ respectively, and the new $D_8$ indication becomes stored in the $S_7$ section. In like manner, additional borehole width indications obtained during upward movement of the sonde 10 will be transferred into, through and out of the memory circuit so that the set of width indications stored by that circuit progressively changes with such upward movement in respect to the make-up of the particular indications forming that set. At any time, however, the width indications stored in the $S_5$ to $S_1$ sections of the circuit will collectively represent the volumetric distribution of drilling mud in the Z depth zones where circulating currents in the mud will have measurably significant effect upon the output signal from sonde 10. At the time when the sonde is in the position shown in FIG. 1, such depth zones will be the zones $Z_5$–$Z_1$. The binary indications $D_5$–$D_1$ of the typical radius values (and, hence, of the volumes) of the zones $Z_5$–$Z_1$ are stored at that time in the sections $S_5$–$S_1$.

The memory circuit sections $S_5$–$S_1$ are each connected to a corresponding one of a plurality of diode matrix circuits $M_5$–$M_1$. Each such matrix circuit includes a set of four resistors. Thus, considering as exemplary the matrix circuit $M_5$, included in this circuit are the four resistors $R_{50}$–$R_{53}$. As described in detail in the mentioned textbook by Millman and Taub, matrix circuit $M_5$ is controlled by the particular binary indication stored in section $S_5$ to select for current conduction a particular one of the four mentioned resistors. Specifically, when the stored binary indication is 0–0, 0–1, 1–0 or 1–1, the resistor selected for current conduction will be, respectively $R_{50}$, $R_{51}$, $R_{52}$ or $R_{53}$. In like manner, in each of the other matrix circuits a one of the four resistors included in that circuit is selected for current conduction in accordance with the particular binary indication manifested in the storage section associated with that matrix circuit.

The four named resistors $R_{50}$–$R_{53}$ have respective conductivity values which are selected to bear the same proportional relation to each other as the proportional relation existing between the four radius values $r_0$–$r_3$. It follows that when, for example, a binary indication of 1–1 (representing radius value $r_3$) selects resistor $R_{53}$ for conduction, and when (as later described) a voltage signal is then applied to resistor $R_{53}$ to produce current flow therein, the value of such current will be proportional to the radius value $r_3$. At this juncture, therefore, the radius value $r_3$ becomes represented by the value of the current output from a resistor rather than by a binary indication.

In each of the other four diode matrix circuits $M_4$–$M_1$, the four resistors included therein are likewise characterized by conductivity values which, for that particular set of resistors, bear a proportional relation to each other which is the same as the proportional relation existing between the radius values $r_0$–$r_3$. Accordingly of, say, the four resistors $R_{40}$–$R_{43}$ included within the matrix circuit $M_4$, in that set of resistors $R_{40}$–$R_{43}$ the resistor $R_{43}$ will be representative of the radius value $r_3$ just as, in the set of resistors $R_{50}$–$R_{53}$ within, matrix circuit $M_4$, the resistor $R_{53}$ is representative of this radius value. However, the respective resistors in the several matrix circuits $M_4$–$M_1$ which represent any one particular radius value are resistors which in relation to each other are of different conductivity values. For example, the resistors $R_{53}$, $R_{43}$, $R_{33}$, $R_{23}$ and $R_{13}$ which represent the radius value $r_3$ in, respectively, the matrix circuits $M_4$–$M_1$ are resistors which have different conductivity values in relation to each other.

Such differences in conductivity value are adapted to proportion the conductivities of the resistor groups of the several matrix circuits so that, in any one such circuit, the value of current flowing through the resistor selected for conduction will be a value which is weighted in accordance with the distance of the depth zone corresponding to that matrix circuit from the center point of the coil array 51–55. In this connection, reference is made to FIG. 2. As shown by that figure, the zones $Z_1$–$Z_5$ are positioned relative to coil array 51–55 to render zones $Z_1$ and $Z_5$ farther from the center thereof than zones $Z_2$ and $Z_4$. The zones $Z_2$ and $Z_4$ are, in turn, farther from such center than is zone $Z_3$. The amount by which circulating currents induced in a portion of drilling mud 12 can effect the output signal from the coil array is an amount which varies inversely with the distance of that portion from the center of the array. It follows that, in order to properly evaluate the effect on the output signal of the volume of drilling mud in each of zones $Z_1$–$Z_5$, it is necessary to introduce by weighting a correction for the mentioned distance factor into any indication of the contribution of such volume to the mentioned output signal. In the last analysis, the respective output currents from matrix circuits $M_5$–$M_1$ are representative of the respective contributions to the output signal from coil array 51–55 of the volumes of drilling mud in, respectively, the zones $Z_5$–$Z_1$. Therefore, it is appropriate that, as described, such output currents be relatively weighted in accordance with the distance of the correlated depth zones from the center of the coil array.

In consonance with the foregoing explanation, among the respective resistors of matrix circuits $M_5$–$M_1$ which are representative of any one particular radius value, the conductivities of those resistors are relatively weighted in such manner that the resistors in circuits $M_5$ and $M_1$ are of least conductivity, the resistor in circuit $M_3$ is of most conductivity, and the resistors in circuits $M_4$ and $M_2$ are of intermediate conductivity. This mode of weighting derives from the consideration that the respective current outputs of matrix circuits $M_5$, $M_1$, $M_3$ and $M_4$, $M_2$ are outputs which are respectively associated with the zones $Z_5$, $Z_1$ farthest from the center point of the coil array, the zone $Z_3$ nearest to such center point, and the zones $Z_4$, $Z_2$ at intermediate distances from such center point.

As has been previously indicated, in each of matrix circuits $M_5$–$M_1$, the resistor selected for conduction is energized with a voltage signal to produce a flow of current through that resistor. This voltage signal is obtained from a tap 120 which is slidable over a voltage energized resistance winding 121, the tap and winding together forming a potentiometer. From the tap 120, the voltage signal is supplied to all of matrix circuits $M_5$–$M_1$ to be applied in each matrix circuit to the resistor therein which has been selected for conduction.

The setting of tap 120 is adjusted to render the voltage at the tap proportional to a typical value of conductivity of the drilling mud in the borehole for which a well log is, at the time, being obtained. While, if needed, the setting of the tap can be changed to reflect substantial changes in drilling mud conductivity at different depths in any one borehole, ordinarily this need not be done in view of the fact that in any particular borehole it is usual for the drilling mud conductivity to be fairly uniform at all depths. A new setting of the tap is, however, usually required when the well logging of a new borehole is undertaken.

From the foregoing, it will be seen that each matrix circuit provides a current output with a value having a significance as follows. First, the current value is representative of a particular depth zone in the borehole in which circulating currents induced in the drilling mud significantly effect the conductivity signal from the coil array. Second, because the current value is proportional to the typical radius value of that depth zone, the current value is proportional to the volume of drilling mud occupying that zone. Third, the current value is doubly weighted to take into account the facts that the conductivity of that volume of drilling mud and the distance thereof from the center of the coil array are factors which in part determine the effect of that particular volume of drilling mud on the mentioned conductivity signal. Accordingly, the mentioned current value is proportional to that fraction of the total value of the conductivity signal from sonde 10 which is attributable to the volume of drilling mud whose effect is represented by the current value.

The respective current outputs of all of the matrix circuits $M_5$–$M_1$ are applied with positive polarity to the input circuit of a D.C. operational amplifier 126 having an input resistor 125 and a feed back resistor 127. Operational amplifiers of this sort are described in detail in the mentioned textbook by Millman and Taub. The flow of such current outputs develops across the input circuit of the amplifier 126 a correction signal which manifests itself as a positive polarity voltage having an amplitude proportional to the sum of the respective values of such current outputs. Thus, the correction signal voltage of positive polarity is proportional to the sum of the respective contributions to the conductivity signal of all of the volumes of drilling mud wherein circulating currents can significantly affect the conductivity signal.

The conductivity signal is applied by leads 20, 21 to resistor 125 to manifest itself across the input circuit of amplifier 126 as a voltage of negative polarity. As described, this negative polarity voltage signal is comprised of an unwanted component contributed by drilling mud and of the wanted component contributed by earth matter. Because of the opposite polarities of the conductivity and correction signals, the amplifier 126 operates to subtract the latter from the former to produce as an output a signal having the value of the conductivity signal as reduced by the value of the correction signal. By appropriate relative scaling of the voltage values of the conductivity signal and of the correction signal, the content of unwanted component in the output signal from amplifier 126 is entirely or substantially eliminated. Therefore, this output signal is rendered in the nature of a corrected conductivity signal which, as desired, is representative only of the conductivity of the earth matter inductively probed by the coil array 51–55.

From the output of amplifier 126, the corrected conductivity signal is applied to the low pass filter 130 which removes high frequency transients produced by interruption of the current outputs from matrix circuits $M_5$–$M_1$ during transfer from one storage section to the next of the binary indications stored in the memory circuit. After being so filtered, the corrected conductivity signal is supplied via leads 40, 41 to recorder 42 (FIG. 1) to produce the described well log.

The above described embodiment being exemplary only, it will be understood that the invention hereof comprehends embodiments differing in form and/or detail from that described herein. For example, the number of storage sections of the memory circuit may be made equal to the number of width indications obtained over the borehole length where drilling mud significantly affects the measurement signal in instances where it is feasible to dispose the caliper on the sonde at such position relative to the sensing means thereon that the caliper is at an extremity of the significant borehole length rather than beyond such extremity. Furthermore, the horizontal extent of the localized region within which drilling mud may significantly contribute to the measurement signal may be demarcated into more than four radial subdivisions, whereby pulse groups, inclusive at the maximum of, say, seven pulses rather than three pulses, may be employed to indicate variations in the diameter of the borehole, the memory circuit being correspondingly modified to register as binary indications a count of up to seven of such pulses. Accordingly, the invention is not to be considered as limited save as is consonant with the scope of the following claims.

I claim:

1. Apparatus to determine the value of a physical characteristic of earth matter surrounding a fluid containing well hole, said apparatus comprising sensing means adapted to be placed in said hole to detect such characteristic within a localized region extending from below to above said means to include a limited length of said hole and earth matter adjacent said limited length of said hole, said sensing means being responsive to such characteristic to represent the same by a first signal having wanted and unwanted components which are respectively derived from the earth matter in said region and the fluid contained within said limited length of said hole, means to provide a respective indication of hole width at each of a plurality of points within said limited length of said hole, means coupled to said indication providing means to combine said indications to produce a second signal representative of said unwanted component, and means to combine said first signal with said second signal to produce a modified first signal having a reduced amount of said unwanted component.

2. Apparatus to determine the value of a physical characteristic of earth matter surrounding a fluid containing well hole, said apparatus comprising sensing means adapted to be placed in said hole to detect such characteristic within a localized region extending from below to above said means to include a limited length of said hole and earth matter adjacent said limited length of said hole, said sensing means being responsive to such characteristic to represent the same by a first signal having wanted and unwanted components which are respectively derived from the earth matter in said region and the fluid contained within said limited length of said hole, means to provide a respective indication of hole width at each of a plurality of points within said hole length, means to weight each such indication in accordance with the location of the corresponding point relative to said sensing means, indications corresponding to points closer to said sensing means being assigned greater weights than indications corresponding to more remote points, means coupled to said weighting means to combine said weighted indications to produce a second signal representative of said unwanted component, and means to combine said first signal with said second signal to produce a modified first signal having a reduced amount of said unwanted component.

3. Apparatus to determine the value of a physical characteristic of earth matter surrounding a fluid containing well hole, said apparatus comprising sensing means adapted to be placed in said hole to detect such characteristic within a localized region extending from below to above said means to include a limited length of said hole and earth matter adjacent said limited length of said hole, the location along said well hole of said limited length of hole changing correspondingly with movement of said sensing means through said hole, and said sensing means being responsive to such characteristic to represent the same by a first signal having wanted and unwanted components which are respectively derived from the earth matter in said region and the fluid contained within said limited length of said hole, means to move said sensing means in a selected direction through said well hole, means adapted after each of consecutive amounts of such movements less than said limited length of hole to produce an indication of hole width at the point in said hole then at the end of said limited length of hole ahead of said sensing means with respect to its direction of movement, memory means to store each new indication so produced along with similarly and previously produced indications of hole width at other points lying within the extent of said limited length of hole at the time of such new indication, means coupled to said memory means to combine said stored indications to produce a second signal representative of said unwanted component, and means to combine said first signal with said second signal to produce a modified first signal having a reduced amount of said unwanted component.

4. Apparatus to determine the value of a physical characteristic of earth matter surrounding a fluid containing well hole, said apparatus comprising sensing means adapted to be placed in said hole to detect such characteristic within a localized region extending from below to above said means to include a limited length of said hole and earth matter adjacent said limited length of said hole, the location along said well hole of said limited length of hole changing correspondingly with movement of said sensing means through said hole, and said sensing means being responsive to such characteristic to represent the same by a first signal having wanted and unwanted components which are respectively derived from the earth matter in said region and the fluid contained within said limited length of said hole, means to move said sensing means in a selected direction through said well hole, means adapted after each of consecutive amounts of such movements less than said limited length of hole to produce an indication of hole width at the end of said limited length of hole ahead of said sensing means with respect to its direction of movement, memory means to store each new indication so produced along with those indications produced at points lying within the extent of said limited length of hole at the time of such new indication, means to weight each indication in accordance with the location of the corresponding point relative to said sensing means, indications corresponding to points closer to said sensing means being assigned greater weights than indications corresponding to more remote points, means coupled to said weighting means to combine said stored weighted indications to produce a second signal representative of said unwanted component, and means to combine said first signal with said second signal to produce a modified first signal having a reduced amount of said unwanted component.

5. Apparatus to determine the value of a physical characteristic of earth matter surrounding a fluid containing well hole, said apparatus comprising sensing means adapted to be placed in said hole to detect such characteristic within a localized region extending from below to above said means to include a limited length of said hole and earth matter adjacent said limited length of said hole, the location along said well hole of said limited length of hole changing correspondingly with movement of said sensing means through said hole, and said sensing means being responsive to such characteristic to represent the same by a first signal having wanted and unwanted components which are respectively derived from the earth matter in said region and the fluid contained within said limited length of said hole, means to move said sensing means in a selected direction through said well hole through consecutive intervals less than said limited length of hole, means synchronized with said movement to produce a control signal each time said sensing means moves through one of said intervals, means responsive to each such control signal to produce an indication of hole width at the point in said hole then at the end of said limited length of hole ahead of said sensing means with respect to its direction of movement, memory means to store the number of such indications produced as said sensing means moves in an amount equal to said limited length of hole, said memory means when said number of indications has been stored being adapted to accommodate each further indication in storage by dropping from storage the then oldest stored indication, means coupled to said memory means to combine said stored indications to produce a second signal representative of said unwanted component, and means to combine said first signal with said second signal to produce a modified first signal having a reduced amount of said unwanted component.

6. Apparatus to determine the value of a physical characteristic of earth matter surrounding a fluid containing well hole, said apparatus comprising sensing means adapted to be placed in said hole to detect such characteristic within a localized region extending from below to above said means to include a limited length of said hole and earth matter adjacent said limited length of said hole, the location along said well hole of said limited length of hole changing correspondingly with movement of said sensing means through said hole, and said sensing means being responsive to such characteristic to represent the same by a first signal having wanted and unwanted components which are respectively derived from the earth matter in said region and the fluid contained within said limited length of said hole, means to move said sensing means in a selected direction through said well hole through consecutive intervals less than said limited length of hole, means synchronized with said movement to produce a control signal each time said sensing means moves through one of said intervals, means responsive to each such control signal to produce an indication of hole width at the point in said hole then at the end of said limited length of hole ahead of said sensing means with respect to its direction of movement, memory means to store the number of such indications produced as said sensing moves in an amount equal to said limited length of hole, said memory means when said number of indications has been stored being adapted to accommodate each further indication in storage by dropping from storage the then oldest stored indication, means to weight each indication in accordance with the location of the corresponding point relative to said sensing means, indications corresponding to points closer to said sensing means being assigned greater weights than indications corresponding to more remote points, means coupled to said weighting means to combine said stored weighted indications to produce second signal representative of said unwanted component, and means to combine said first signal with said second signal to produce a modified first signal having a reduced amount of said unwanted component.

7. Well logging apparatus comprising means adapted to be placed in a well hole to there produce a plurality of indications each representing the value of the width of said hole at a respective one of a plurality of vertically spaced points included within a limited vertical length of said hole, means to weight each such width indication in accordance with the location of the point at which such indication is produced relative to a common reference point, means for obtaining measurements over said hole length of a physical characteristic manifested within said hole whose value is dependent at least in part upon the width of said hole, and means coupled to said weighting means and said measurement means to combine said weighted width indications and said measurements to provide an integrated measure over said hole length of said physical characteristic.

8. Well logging apparatus comprising, means adapted to be placed in a well hole to there produce seriatim a plurality of indications each representing the width of said hole at a respective one of a plurality of vertically spaced points included within a limited vertical length of said hole, memory means coupled to said indication producing means to store said indications, means for obtaining measurements over said hole length of a physical characteristic manifested within said hole whose value is dependent at least in part upon the width of said hole, and means collectively responsive to ones of said stored indications and to said measurements to provide an integrated measure over said hole length of said physical characteristic.

9. Well logging apparatus comprising, means adapted to be placed in a well hole to there produce seriatim a plurality of indications each representing the width of said hole at a respective one of a plurality of vertically spaced points included within a limited vertical length of said hole, memory means coupled to said indication producing means to receive and store said indications, means coupled to said memory means to weight each of ones of said indications in accordance with the location of the corresponding point relative to a common reference point, means for obtaining measurements over said hole length of a physical characteristic manifested within said hole whose value is dependent at least in part upon the width of said hole, and means responsive to said stored weighted indications and said measurements to provide an integrated measure over said hole length of said physical characteristic.

10. Well logging apparatus comprising, indicating means adapted to be placed in a well hole to there be subject to actuation to produce an indication representing a value, at the level at which said means is then disposed, of a physical characteristic manifested within said hole, means to move said indicating means in said hole in a selected direction along said well hole to change progressively thereby the level of said indicating means, means coupled to said indicating means and intermittently operable in the course of such movement to produce seriatim a plurality of indications in digital form of said physical characteristic corresponding to different levels reached by said indicating means, shift register means coupled to said intermittently operable means to receive and store a predetermined number of such indications, said shift register means being operable thereafter to store each additional new indication by dropping from storage the then oldest stored indication, output means for said shift register means to render available a single output correlated in value with the value of a combined plurality of the indications stored therein at any given time, and means for combining said single output with an output representative of another characteristic manifested within said hole to produce an indication of said other characteristic correlated with said first mentioned physical characteristic.

11. Well logging apparatus comprising, indicating means adapted to be placed in a well hole to there be subject to actuation to produce an indication representing a value, at the level at which said means is then disposed, of a physical characteristic manifested within said hole, means to move said indicating means in said hole in a selected direction along said well hole to change progressively thereby the level of said indicating means, means coupled to said indicating means and synchronized with said movement for successive actuation as said indicating means traverses predetermined vertical intervals of said hole in the course of such movement to produce seriatim a plurality of indications in digital form of said physical characteristic corresponding to different levels reached thereby, shift register means coupled to said indication producing means to receive and store a predetermined number of such indications, said shift register means being operable thereafter to store each additional new indication by dropping from storage the then oldest stored indication, output means for said shift register means to render available a single output correlated in value with the value of a combined plurality of the indications stored therein at any given instant, and means for combining said single output with an output representative of another characteristic manifested with said hole to produce an indication of said other characteristic correlated with said first mentioned physical characteristic.

12. Well logging apparatus comprising, indicating means adapted to be placed in a well hole to there be subject to actuation to produce an indication of hole width at the level at which said means is then disposed, means to move said indicating means in said hole in a selected direction along said well hole to change progressively thereby the level of said indicating means, means coupled to said indicating means and synchronized with said movement for successive actuation as said indicating means traverses predetermined vertical intervals of said hole in the course of such movement to produce seriatim a plurality of width indications in digital form corresponding to different levels reached thereby, digital memory means to store a predetermined number of such indications, said memory means being operable thereafter to store each additional new indication by dropping from storage the then oldest stored indication, and output means for said memory means to render available a single output in analog form correlated in value with the value of a combined plurality of the width indications stored therein at any given time.

13. Well logging apparatus comprising, indicating means adapted to be placed in a well hole to there be subject to actuation to produce an indication of hole width at the level at which said means is then disposed, means to move said indicating means in said hole in a selected direction to change progressively thereby the level of said indicating means, means coupled to said indicating means and synchronized with said movement for successive actuation as said indicating means traverses predetermined vertical intervals of said hole in the course of such movement to produce seriatim a plurality of width indications in digital form corresponding to different levels reached thereby, shift register means to store a predetermined number of such indications, said shift register means being operable thereafter to store each additional new indication by dropping from storage the then oldest stored indication, means coupled to said shift register means to weight each of ones of said stored indications in accordance with the location of the corresponding level relative to a common reference level, indications corresponding to points close to said common reference level being assigned greater weights than indications corresponding to more remote points, and means collectively responsive to said stored weighted indications to provide an integrated measure of the value of a physical condition manifested in said hole, which measure is correlated with the width of said hole.

14. Well logging apparatus comprising, a sonde adapted to be placed in a well hole which traverses earth matter and which contains fluid, sensing means on said sonde to indicate by a first signal the value sensed thereby of a physical characteristic manifested by said earth matter and fluid, caliper means vertically offset from said sensing means on said sonde and adapted to measure the width of said hole, means to move said sonde vertically in said hole in the direction of offset of said caliper means from said sensing means, means operable during said movement to derive from said caliper means an analog indication of hole width at the level then reached by said caliper means, converter means coupled to said deriving means to translate each such analog indication into a binary indication, shift register means coupled to said converter means to store a predetermined number of said binary indications and, thereafter, to store each additional new indication by dropping from storage the then oldest stored indication, means in circuit with said shift register means to weight the value of each of ones of said stored indications in accordance with the location relative to said sensing means of the level at which such indication was obtained, indications corresponding to points closer to said sensing means being assigned greater weights than indications corresponding to more remote points, means collectively responsive to said stored weighted indications to produce a second signal representative of the contribution to said first signal of said characteristic as manifested by said fluid, and means to subtract said second signal from said first signal to produce an output signal representing the contribution to said first signal of said characteristic as manifested by said earth matter.

15. Apparatus to determine the value of a physical characteristic of earth matter surrounding a fluid containing well hole, said apparatus comprising sensing means adapted to be placed in said hole to detect such characteristic within a localized region extending from below to above said means to include a limited length of said hole and earth matter adjacent said limited length of said hole, said sensing means being responsive to such characteristic to represent the same by a first signal having wanted and unwanted components which are respectively derived from the earth matter in said region and the fluid contained within said limited length of said hole, means to provide respective indications of the separate contributions made to said first signal by the conductivity of volumetric portions of said fluid contained within separate vertical sections of said limited length of said hole, means responsive to such plurality of indications to produce as a collective effect thereof a second signal having a value which is representative of the overall contribution made to said first signal by said fluid portions, and means to combine said first signal with said second signal to produce a modified first signal having a reduced amount of said unwanted component.

16. Apparatus to determine the value of a physical characteristic of earth matter surrounding a fluid containing well hole, said apparatus comprising sensing means adapted to be placed in said hole to detect such characteristic within a localized region extending from below to above said means to include a limited length of said hole and earth matter adjacent said limited length of said hole, said sensing means being responsive to such characteristic to represent the same by a first signal having wanted and unwanted components which are respectively derived from the earth matter in said region and the fluid contained within said limited length of said hole, means to provide respective indications of the separate contributions made to said first signal by the conductivity of volumetric portions of said fluid contained within separate vertical sections of said limited length of said hole, means to differentially weight said indications in accordance with the different vertical locations relative to a common reference point of the fluid portions from which said indications are respectively derived, means responsive to said weighted indications to produce as a collective effect thereof a second signal having a value which is representative of the overall contribution made to said first signal by said portions of said fluid, and means to combine said first signal with said second signal to produce a modified first signal having a reduced amount of said unwanted component.

17. Well logging apparatus for investigating subsurface physical characteristics in or adjacent a well hole drilled into the earth comprising, means adapted to be placed in the well hole to detect a selected subsurface characteristic, means coupled to the detecting means for producing a plurality of digital signals each representing a value of the detected characteristic at a respective one of a plurality of longitudinally spaced points in the hole, multi-stage digital register means coupled to the digital signal producing means for storing in multi-digit binary form the respective ones of at least a given number of said plurality of digital signals, means adapted to shift said multi-digit binary indications through successive stages of said register in correlation with movement of said subsurface characteristic detecting means along said well hole, and means coupled to the register means and responsive to digital indications stored therein for providing an indication of a subsurface characteristic.

18. Well logging apparatus for investigating subsurface physical characteristics in or adjacent a well hole drilled into the earth comprising, means adapted to be placed in the well hole to detect a selected subsurface characteristic, means coupled to the detecting means for producing a plurality of digital signals each representing a value of the detected characteristic at a respective one of a plurality of longitudinally spaced points in the hole, digital shaft register means coupled to the digital signal producing means for storing digital indications of at least a given number of said plurality of digital signals, means for shifting the register locations of the indications stored in the shift register in synchronism with changes in the longitudinal location of the detecting means in the hole, and computing means coupled to the shift register means combining the digital indications stored therein with an indication of another subsurface characteristic to provide a modified indication of said other subsurface characteristic.

19. Apparatus for processing well logging signals obtained from an exploring device moved through a well hole drilled into the earth comprising: means for supplying indications of the measurement signals obtained from the well hole measuring device; means coupled to the indication supplying means for producing a plurality of digital signals each representing a value of the measurement signal at a respective one of a plurality of longitudinally spaced points in the well hole, digital memory means coupled to the digital signal producing means for storing digital indications of at least a given number of said plurality of digital signals, means for coordinating the storage of the digital indications with the corresponding longitudinal locations of the exploring device in the well bore, and computing means coupled to the memory means for combining the digital indications stored therein with an indication of another measurement signal to provide a modified indication of said other measurement signal.

References Cited
UNITED STATES PATENTS

| | | | |
|---|---|---|---|
| 2,836,359 | 2/1958 | Mazzagatti | 340—15.5 X |
| 2,926,331 | 2/1960 | Lindsey | 340—15.5 |
| 2,949,973 | 8/1960 | Broding et al. | 181—.5 |
| 2,956,635 | 10/1960 | Summers | 181—.5 |
| 2,975,399 | 3/1961 | Burns | 340—15.5 |
| 3,007,134 | 10/1961 | Kolb | 340—18 |
| 3,015,801 | 1/1962 | Kolbfell | 324—1 X |
| 3,018,839 | 1/1962 | Isaacson | 181—.5 |
| 3,166,709 | 1/1965 | Doll | 324—1 X |

RUDOLPH V. ROLINEC, *Primary Examiner.*

G. R. STRECKER, *Assistant Examiner.*